(12) United States Patent
Xiong et al.

(10) Patent No.: US 11,964,376 B2
(45) Date of Patent: Apr. 23, 2024

(54) MULTI-FUNCTION HANDHELD ELECTRIC TOOL

(71) Applicant: TECHTRONIC CORDLESS GP, Anderson, SC (US)

(72) Inventors: Guo Hui Xiong, Dongguan (CN); Wei Bing Wang, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 301 days.

(21) Appl. No.: 17/620,399

(22) PCT Filed: Sep. 24, 2020

(86) PCT No.: PCT/CN2020/117508
§ 371 (c)(1),
(2) Date: Dec. 17, 2021

(87) PCT Pub. No.: WO2022/061665
PCT Pub. Date: Mar. 31, 2022

(65) Prior Publication Data
US 2022/0339772 A1    Oct. 27, 2022

(51) Int. Cl.
*B25F 5/00*     (2006.01)
*B23B 45/02*    (2006.01)
(Continued)

(52) U.S. Cl.
CPC .............. *B25F 5/001* (2013.01); *B23B 45/02* (2013.01); *B25F 3/00* (2013.01); *B25B 23/147* (2013.01); *B25D 16/003* (2013.01)

(58) Field of Classification Search
CPC .................................................. B25D 16/003
See application file for complete search history.

(56) References Cited

U.S. PATENT DOCUMENTS 3,736,992 A    6/1973    Zander et al.
5,451,127 A    9/1995    Chung
(Continued)

FOREIGN PATENT DOCUMENTS

CH         526374 A      8/1972
CN      201239943 Y      5/2009
(Continued)

OTHER PUBLICATIONS

Ridgid, R841150 assembly diagram, Rev. 06, dated Jan. 10, 2008 (1 page).

(Continued)

*Primary Examiner* — Daniel Jeremy Leeds
(74) *Attorney, Agent, or Firm* — Michael Best & Friedrich LLP

(57) ABSTRACT

A multi-function handheld electric tool includes a motor housing receiving a motor, a settable clutch coupled with a speed reduction transmission, transmission housing coupled to the motor housing and having a first housing portion coupled to the motor housing, and a second housing portion extending from the first portion towards a chuck, and a setting collar which is rotatably fit over the second housing portion of the transmission housing and rotatable between a plurality of predetermined angular positions of which at least one corresponds to a non-torque limited first operation mode of the tool and the remaining positions correspond to different torque output levels of a torque limited second operation mode of the tool.

7 Claims, 5 Drawing Sheets

(51) Int. Cl.
B25B 23/147 (2006.01)
B25D 16/00 (2006.01)
B25F 3/00 (2006.01)

(56) References Cited

U.S. PATENT DOCUMENTS

| | | |
|---|---|---|
| 6,688,406 B1 | 2/2004 | Wu et al. |
| 6,892,827 B2 | 5/2005 | Toyama et al. |
| 6,926,095 B2 | 8/2005 | Chen |
| 7,775,294 B2 | 8/2010 | Ren et al. |
| 8,322,457 B2 | 12/2012 | Mok et al. |
| 8,939,228 B2 | 1/2015 | Kondo |
| 9,205,547 B2 | 12/2015 | Hirabayashi et al. |
| 9,849,574 B2 | 12/2017 | Hecht et al. |
| 9,878,434 B2 | 1/2018 | Hecht et al. |
| 9,908,228 B2 | 3/2018 | Elger |
| 2006/0201688 A1 | 9/2006 | Jenner et al. |
| 2006/0213675 A1 | 9/2006 | Whitmire et al. |
| 2007/0068693 A1 | 3/2007 | Whitmire et al. |
| 2007/0084614 A1 | 4/2007 | Whitmire et al. |
| 2009/0194305 A1* | 8/2009 | Xu ................ B25D 16/006 173/48 |
| 2009/0277658 A1 | 11/2009 | Chen |
| 2010/0200257 A1 | 8/2010 | Scrimshaw et al. |
| 2012/0018181 A1 | 1/2012 | Chen |
| 2012/0255755 A1 | 10/2012 | Kondo |
| 2014/0338940 A1 | 11/2014 | Kelleher et al. |
| 2018/0141200 A1 | 5/2018 | Elger |

FOREIGN PATENT DOCUMENTS

| | | |
|---|---|---|
| CN | 104669215 A | 6/2015 |
| CN | 204621991 U | 9/2015 |
| CN | 205057971 U | 3/2016 |
| DE | 2630319 C2 | 5/1985 |
| EP | 0612589 B1 | 5/1997 |
| GB | 248231 A | 3/1926 |
| GB | 1414377 A | 11/1975 |
| GB | 2334911 B | 9/2000 |

OTHER PUBLICATIONS

Ridgid, "½ in. 18 Volt Hammer Drill Two Speed / Reversible R841150," Operator's Manual, dated Jan. 2005 (22 pages).
Ryobi, "Ryobi ½ in. (13mm) 18 Volt Three Speed Cordless Hammer Drill Model No. HD1830," Repair Sheet, Rev. 04, dated Apr. 5, 2013 (3 pages).
Ryobi, "Ryobi ½ in. (13mm) 18 Volt Three Speed Cordless Hammer Drill Model No. P220," Repair Sheet, Rev. 02, dated Mar. 26, 2013 (4 pages).
Ryobi, "Ryobi ½ in., 18 Volt 3-Speed Hammer Drill P220," Operator's Manual, Rev. 02, dated Jul. 24, 2006 (20 pages).
Ryobi, "Ryobi ½ in., 18 Volt 2-Speed Hammer Drill P210," Operator's Manual, Rev. 01, dated Jul. 24, 2006 (20 pages).
Ryobi, "Ryobi ½ in. (13mm) 18 Volt Two Speed Hammer Drill Model No. P210," Repair Sheet, Rev. 04, dated Dec. 6, 2011 (4 pages).
Ryobi, "½ in. (13 mm) Three Speed Cordless Hammer Drill Model No. HD1830," Operator's Manual, dated Apr. 2004 (20 pages).
Ryobi, "½ in. (13 mm) Three Speed Cordless Hammer Drill Model No. HP1830M," Operator's Manual, dated Jun. 2003 (20 pages).
International Search Report and Written Opinion for Application No. PCT/CN2020/117508 dated Jun. 23, 2021 (10 pages).

* cited by examiner

MULTI-FUNCTION HANDHELD ELECTRIC TOOL

CROSS-REFERENCE TO RELATED APPLICATIONS

This application is a national phase filing under 35 U.S.C. § 371 of International Application No. PCT/CN2020/117508, filed Sep. 24, 2020, the entire content of which is incorporated herein by reference.

BACKGROUND INFORMATION

The present invention relates to multi-function handheld electric tools, and more particularly to multi-function handheld electric tools having two or more, preferably three, modes of operation.

In a multi-function handheld electric tool having two or more modes of operation a user must manually select the appropriate mode of operation for the task at hand and the tool-bit engaged with the tool. Some tools have two separate mode selection means where one mode selector, say a linear switch, changes between hammer and non-hammer functions of the tool, and a second mode selector, say a rotary collar, selects between torque limited and non-torque limited outputs of the tool. It is preferable that a multi-function handheld tool has a single mode selector switch that not only facilitates the selection between two or more operating modes quickly and easily, but which also provides that only one mode of operation can be selected at any one time.

SUMMARY OF THE INVENTION

According to one aspect of the invention there is provided a multi-function handheld electric tool comprising
  i) a motor housing and a motor located inside the housing, the motor having a motor output to which a speed reduction transmission is mounted to be rotatable therewith,
  ii) a settable clutch coupled with the speed reduction transmission to transmit torque from the speed reduction transmission to an output spindle coupled with a chuck,
  iii) a transmission housing coupled to the motor housing and having a first housing portion coupled to the motor housing, and a second housing portion extending from the first portion towards the chuck, at least a part of the speed reduction transmission and the clutch being located within the first portion of the transmission housing,
  iv) a setting collar which is rotatably fit over the second housing portion of the transmission housing and rotatable between a plurality of predetermined angular positions of which at least one corresponds to a non-torque limited first operation mode of the tool and the remaining positions correspond to different torque output levels of a torque limited second operation mode of the tool,
  v) the settable clutch comprising a clutch face having a plurality of clutch ramps extend a fixed axial distance from a linear portion of the clutch face, a clutch washer and a clutch sleeve axially and rotatably located about the second portion of the transmission housing and between the setting collar and the second portion of the transmission housing, the clutch sleeve being located a variable axial distance from the clutch washer, a clutch spring biased between the clutch sleeve and the clutch washer, and a follower located between the clutch face and the clutch washer, wherein
  vi) the clutch sleeve is rotationally fixed with the setting collar and rotatable therewith to move axially on the second portion of the transmission housing such that the variable axial distance is dependent on a respective one of the plurality of predetermined angular positions of setting collar, and wherein in the at least one angular position of the setting collar that corresponds to the non-torque limited first operation mode of the tool the fixed axial distance is greater than the variable axial distance, and in the remaining predetermined angular positions of the setting collar the variable axial distance is greater than the fixed axial distance.

Preferably, at least a second one of the predetermined angular positions of the setting collar corresponds to a non-torque limited third operation mode of the tool, wherein in the second one of the predetermined angular positions the fixed axial distance is greater than the variable axial distance.

Preferably, in at least one of the first or second ones of the predetermined angular positions of the setting collar corresponding to the non-torque limited first or third operation modes of the tool a portion of the clutch sleeve engages with a portion of the clutch washer.

Preferably, the clutch sleeve and clutch washer are positioned outside of the transmission housing, the clutch sleeve being threadably engaged with the second portion of the transmission housing for translating rotational movement of the clutch sleeve into axial movement along the second portion of the transmission housing.

Preferably, the clutch washer is positioned adjacent a transition between the first and second portions of the transmission housing, and wherein the follower includes a pin extending through a bore in the transmission housing.

Preferably, the multi-function handheld electric tool further comprises a pair of opposed ratchet discs located within the second portion of the transmission housing and arranged to selectively impart axial vibrations or impacts to the output spindle, and a lockout mechanism a portion of which is rotatable with the setting collar, the lockout mechanism having an engaged position corresponding to the angular positions of the setting collar that correspond to different torque output levels of the torque limited second operation mode of the tool, and a disengaged position corresponding to one of the first or second angular positions of the setting collar that correspond to the non-torque limited first or third operation modes of the tool, wherein in the engaged position axial vibrations or impacts to the output spindle are inhibited and in the disengaged position axial vibrations or impacts to the output spindle are enabled.

Preferably, the lockout mechanism comprises a ring coupled for co-rotation with the setting collar and having a radially-outward extending recess, and an axial arm coupled for axial, but not rotational, movement with the output spindle and having a radially-outward extending tab, wherein in the disengaged position the radially-outward extending recess and radially-outward extending tab are rotationally co-aligned such that the tab may pass through the recess to allow axial movement of the arm and output spindle.

Further aspects of the invention will become apparent from the following description and appended drawings which are given by way of example only to illustrate the invention.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

The description of the invention set-forth below is intended to be illustrative only using language more or less specific to structural or methodical features of a handheld electrical tool. It is to be understood that the invention is not limited to specific features shown or described since the means herein described comprise preferred forms of putting the invention into effect. Variations and modifications of the forms disclosed herein may be made based on the description without departing from the scope of the invention as set forth in any one of the claims. Further, it will be clearly understood that, if a prior art publication is referred to herein, this reference does not constitute an admission that the publication forms part of the common general knowledge.

Figure 1:
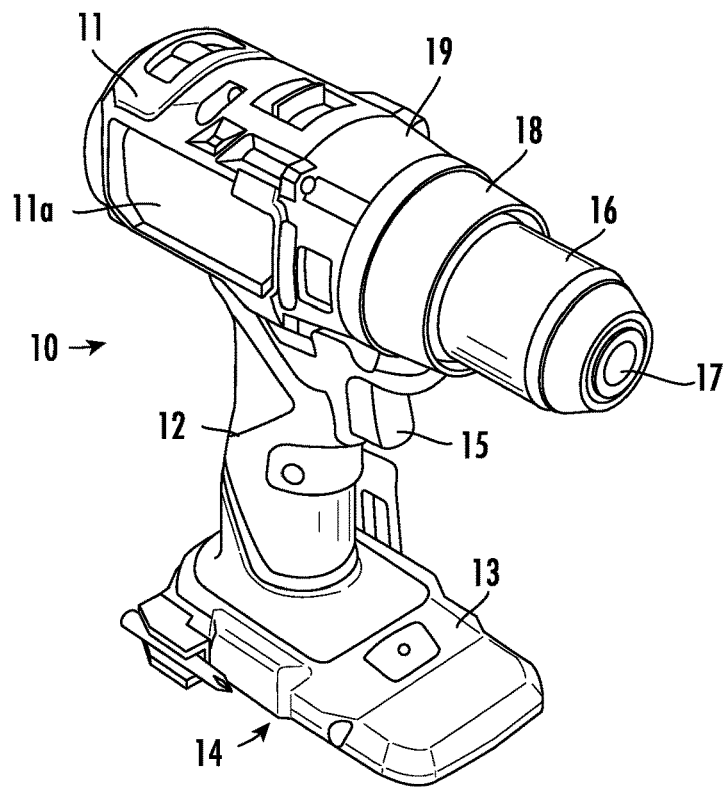
FIG. 1 is a perspective view showing a multi-function handheld electric tool constructed in accordance with the present invention.

Referring to FIG. 1, generally, there is shown a multi-function handheld electrical tool 10 having a pistol-like shape with a handle 12 to be held by hands of an operator and a motor housing 11 extending from a top end of the handle 12 to define therein an interior space for accommodating a motor 11a for generating and transmitting torque from a motor shaft 28. A transmission/gear housing 19 is located at the front of the motor housing and partially encloses a portion of a planetary transmission 25 and a clutch mechanism 30. The transmission/gear housing 19 has a forwardly extending cylindrical extension portion 21 that partially encloses a portion of a hammer mechanism 40 of the tool. A clutch/mode selection collar 18 is rotatably located about the gear housing extension portion 21 and is operable by a user to select between modes of operation of the multi-function handheld electrical tool 10. A chuck 16 is rotatably mounted to an output shaft 20 at a front end of the tool 10, adjacent the collar 18, and has a tool-bit receiving aperture 17 for accommodating an interchangeable tool-bit. Torque is transmitted from the motor shaft 28 to the chuck 16 via the transmission 25, clutch mechanism 30 and output shaft 20. A power switch 15 is disposed on the handle 12 and is accessible by an operator to turn on and off the motor 11a. The motor 11a may be powered by a battery accommodated with a battery receptacle 14 located at the lower distal end 13 of the handle 12. When an operator depresses the power switch 15, power is delivered from the battery to the motor 11a to generate a torque at motor output 28. The output torque is transferred along an output axis of the tool between the motor output 28 and the chuck 16 via the transmission 25, clutch 30 and tool spindle 20. The single clutch/mode setting collar 18 is rotatable by a user to select between one of a plurality of torque limited or non-torque limited functions such a "screwdriver mode" or a "drill-only mode" or a "hammer drill mode".

Figure 2:
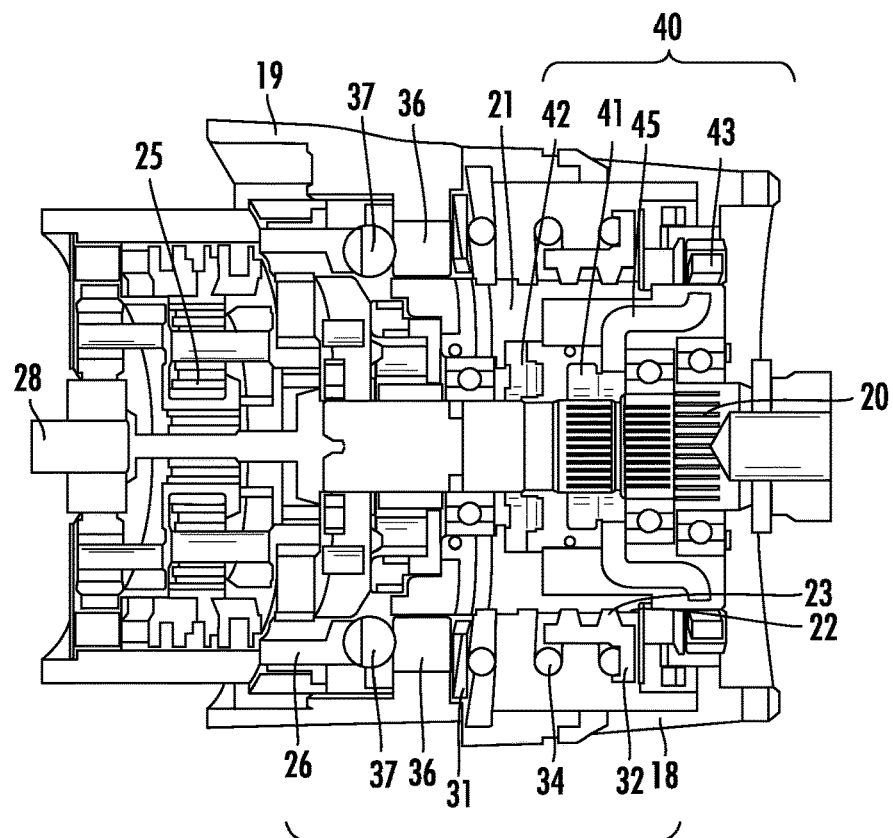
FIG. 2 is a cross-sectional view showing certain features of the gear transmission, clutch mechanism and hammer mechanism of the multi-function handheld electrical tool.
Figure 3:
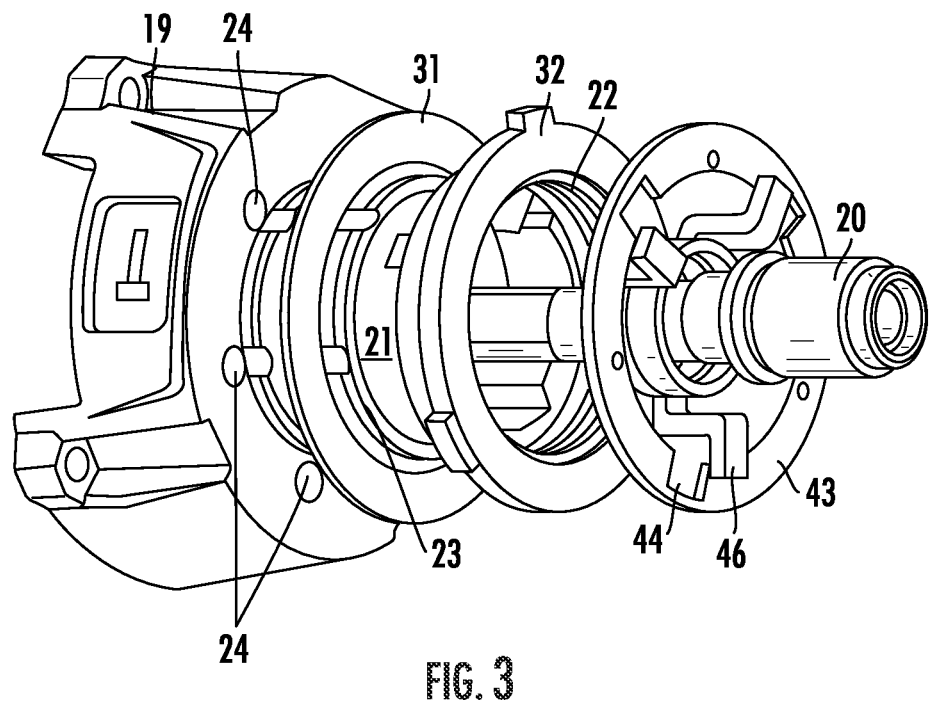
FIG. 3 is a partial exploded perspective view of the transmission housing showing some components of the clutch mechanism and hammer lockout mechanism.
Figure 4:
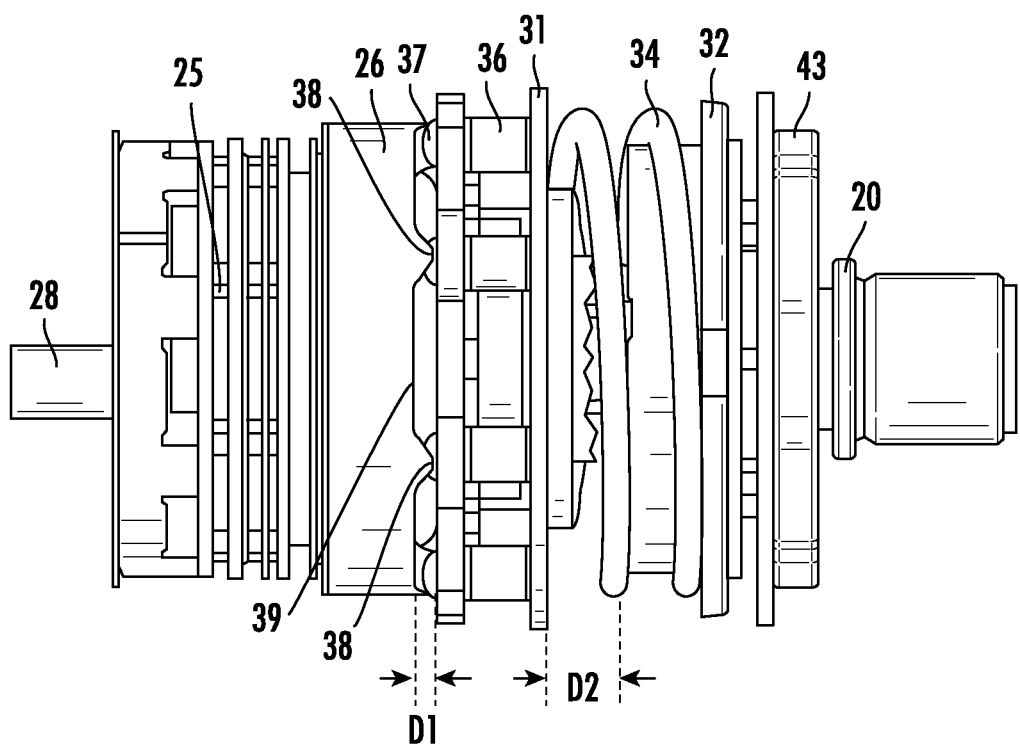
FIG. 4 is a partial view of the gear transmission and clutch mechanism in a first "screwdriver mode" of the tool.

A multi-step clutch mechanism 30 provides a torque limited output to the shaft 20, or can be disabled/locked-out to provide a non-torque limited output. As shown in FIGS. 2 to 4, the multi-step clutch mechanism 30 includes a clutch washer 31 and a sleeve 32 that is axially and rotatably adjustable in response to user rotation of the clutch/mode selection collar 18. The clutch sleeve 32 has a bore having an inner perimeter that includes threads 23 that cooperate with external threads 22 on the external perimeter of gear housing extension portion 21. Clutch sleeve 32 is additionally rotationally fixed with mode selection collar 18. The clutch/mode selection collar 18 is rotatably adjustable by the user of the multi-function tool to select a particular clutch, or torque, setting of the handheld tool, and to shift the tool between screwdriver, drill-only, and hammer drill modes of operation. As the collar 18 is rotated it rotates clutch sleeve 32 causing clutch sleeve 32 to axially progress along gear housing extension portion 21 by interaction of threads 23/22. A coil clutch spring 34 is arranged between the clutch washer 31 and the clutch sleeve 32, such that the clutch washer 31 is biased rearwardly towards the gear transmission 25 (to the left as viewed in FIG. 2) away from the clutch sleeve 32.

The clutch mechanism 30 has a plurality of clutch or torque settings in "screwdriver mode", ranging from a first position of clutch sleeve 32 most axially distant from clutch washer 31 to a second position of clutch sleeve 32 axially proximate clutch washer 31. In the first most axially distant position the clutch spring 34 is in its least compressed or preloaded state, and in the second most axially proximate position the clutch spring 34 is in its most compressed or preloaded stated. Rotating the clutch sleeve 32 via the clutch/mode selection collar 18 adjusts the preload of the clutch spring 34 force on the clutch washer 31, such that the torque limit is adjusted, as described in further detail below. When the clutch sleeve 32 is most proximate to the clutch washer 31 applying maximum preload to the spring 34 the tool is in its drill mode.

The clutch mechanism 30 also includes a plurality of followers such cylindrical pins 36 and balls 37. The plurality of cylindrical pins 36 are received within a respective plurality of circumferentially spaced axial bores 24 in the transmission housing 19. A clutch face 38/39 is defined on a last stage outer ring gear 26 of a transmission 25. The plurality of balls 37 are positioned between the respective pins 36 and the clutch face 38/39. The outer ring gear 26 is positioned in the transmission housing 19 of the hammer drill and is part of the third planetary stage of the transmission 25. The clutch face 38/39 includes a plurality of ramps 38 over which the balls 37 ride when the clutch mechanism 30 is engaged. The ramps 38 extend an axial distance D1 from a linear face portion 39 of the clutch face 38/39, such that the balls 37 must be able to axially translate at least the axial distance D1 away from linear face portion 39 in order to ride over the ramps 38 and thereby clutch the multi-function tool 10. Thus, in order for the clutch to operate the axial distance D2 between the clutch sleeve 32 and the clutch washer 31 must be greater than the of the distance D1 between the ramps 38 and linear face portion 39 of the clutch face. This allows the clutch washer 31 to translate towards the clutch sleeve 32 as the balls 37 ride over the ramps 38.

In operation of "screwdriver mode" shown in FIG. 4 when D2 is greater than D1 torque is transferred from the electric motor output 28 through the transmission 25 and to the spindle 20, during which time the outer ring gear 26 of the transmission 25 remains stationary with respect to the transmission housing 19 due to the pre-load exerted on the clutch face 38/39 by the clutch spring 34, the clutch washer 31, the pins 36 and the balls 37. Upon continued tightening of, for example, a fastener to a particular torque, a corresponding reaction torque is imparted to the spindle 20, causing the rotational speed of the spindle 20 to decrease. When the reaction torque exceeds the torque limit set by the mode selection/clutch collar 18 and clutch sleeve 32, the motor torque is transferred to the outer ring gear 26, causing it to rotate with respect to the transmission housing 19, thereby engaging the clutch mechanism 30 to clutch the tool by diverting the motor torque from the spindle 20. As a result, and because the distance D2 is greater than first axial distance D1, the balls 37 are permitted to axially translate far enough away from linear portion 39 of the clutch face that the balls 37 are allowed to ride up and down the ramps 38 causing the clutch washer 31 to reciprocate along the transmission housing 19 against the bias of the spring 34 between the clutch sleeve 32 and the clutch washer 31. The operation torque of the clutch is set by rotating the clutch/mode collar 18 to axially move clutch sleeve 32 between the first position of the clutch sleeve 32 most axially distant from clutch washer 31, as illustrated in FIG. 4, to the second position of the clutch sleeve 32 axially proximate clutch washer 31, where distance D2 is larger than distance D1. The more proximate the clutch sleeve 32 is to the clutch washer 31 the greater the clutch spring 34 preload and accordingly the higher the clutch operating torque.

Figure 5:
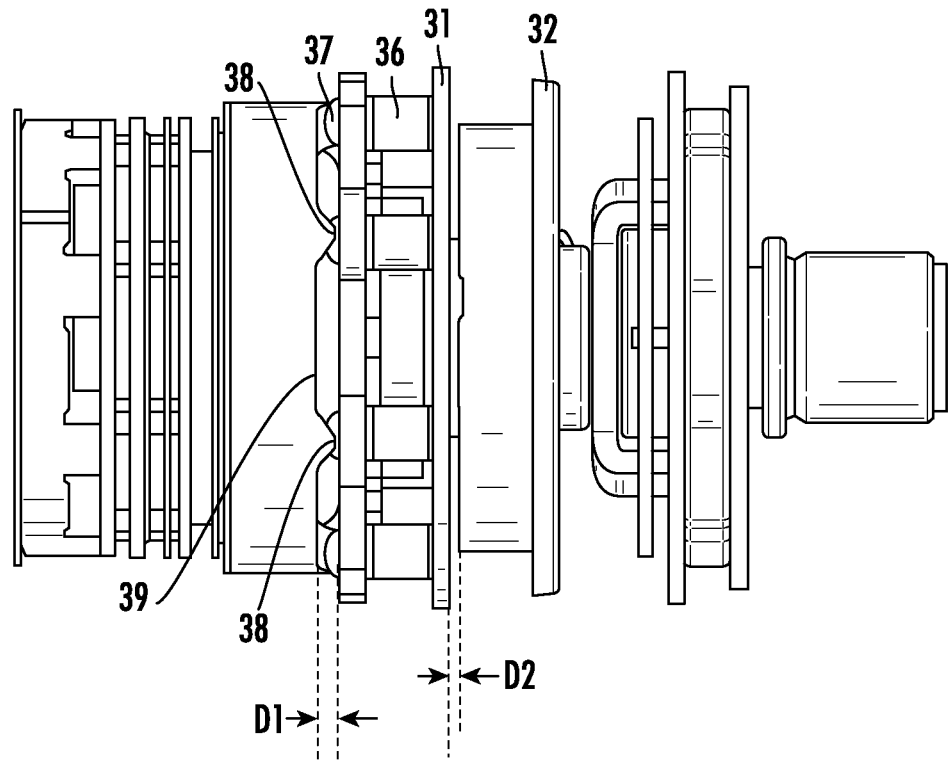
FIG. 5 is a partial view of the gear transmission and clutch mechanism in a second "drill-only mode" of the tool.

In operation of "drill only" shown in FIG. 5 the clutch sleeve 32 is further adjusted to be just adjacent to but not engaging the clutch washer 31 such that distance D2 is less than D1. The balls 37 are prevented from riding over ramps 38 and the clutch mechanism 30 is locked-out. The motor can output torque at a maximum value to the spindle 20. Note that in FIG. 5 the spring 34 is omitted for clarity, but will be under high preload.

Figure 6:
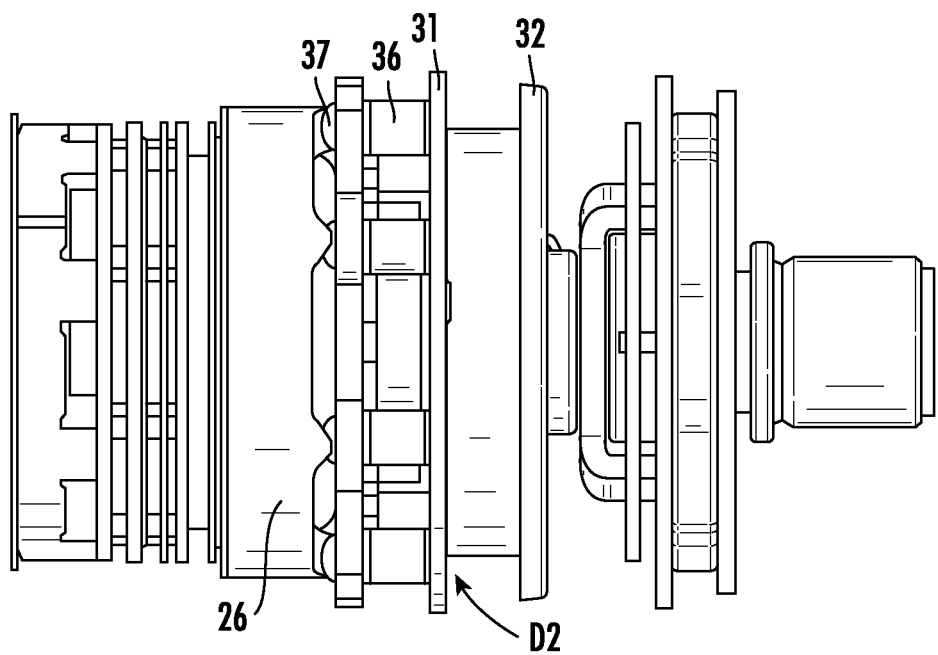
FIG. 6 is a partial view of the gear transmission and clutch mechanism in a third "hammer drill mode" of the tool.

In operation of "hammer drill" mode shown in FIG. 5 the clutch sleeve 32 is further adjusted to be engaging the clutch washer 31 and distance D2 is zero such that there is no gap between the clutch sleeve 32 and the clutch washer 31, the balls 37 are prevented from riding over ramps 38, which have an axial length of D1. Thus, in "hammer drill" mode, the clutch mechanism 30 is locked out and the motor is permitted to output torque at a maximum value to the spindle 20. Note that in FIG. 6 the spring 34 is omitted for clarity, but will be under high preload. In hammer mode the spindle is also permitted to reciprocate axially in a hammer action. This is described further below with reference to FIGS. 2 and 7 to 9.

Figure 7:
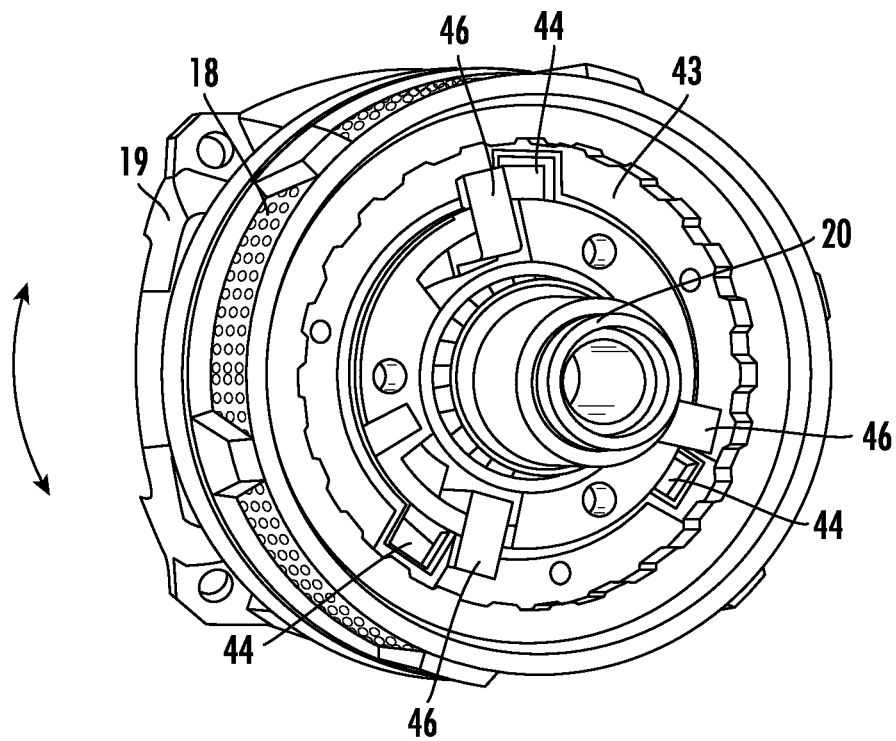
FIG. 7 is a partial view of the hammer lockout mechanism in an enabled position during the first and second operating modes of the tool.
Figure 8:
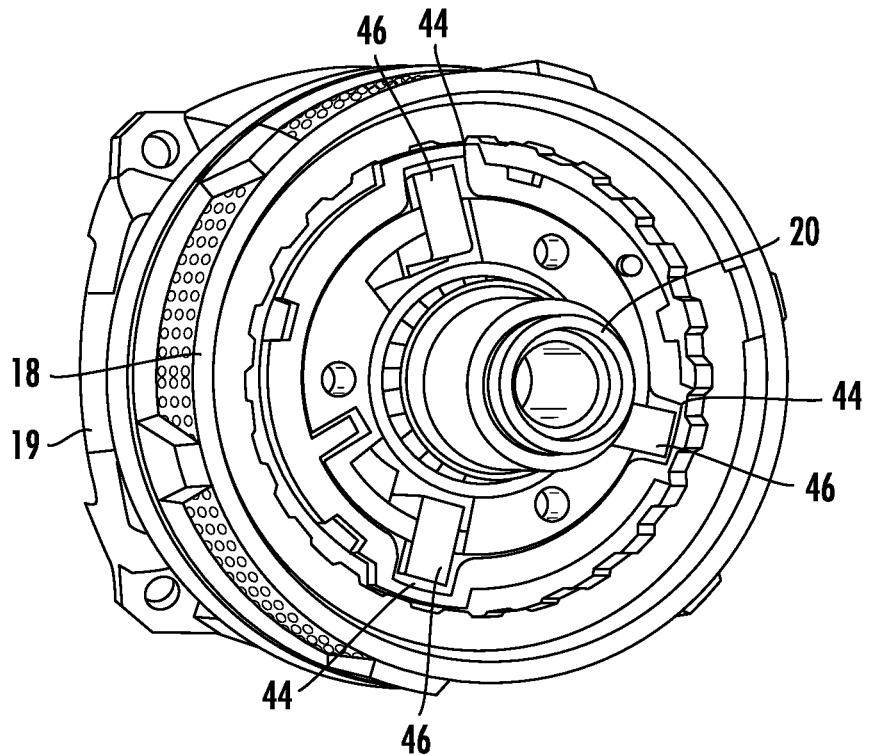
FIG. 8 is a partial view of the hammer lockout mechanism in a disabled position during the third operating mode of the tool.
Figure 9:
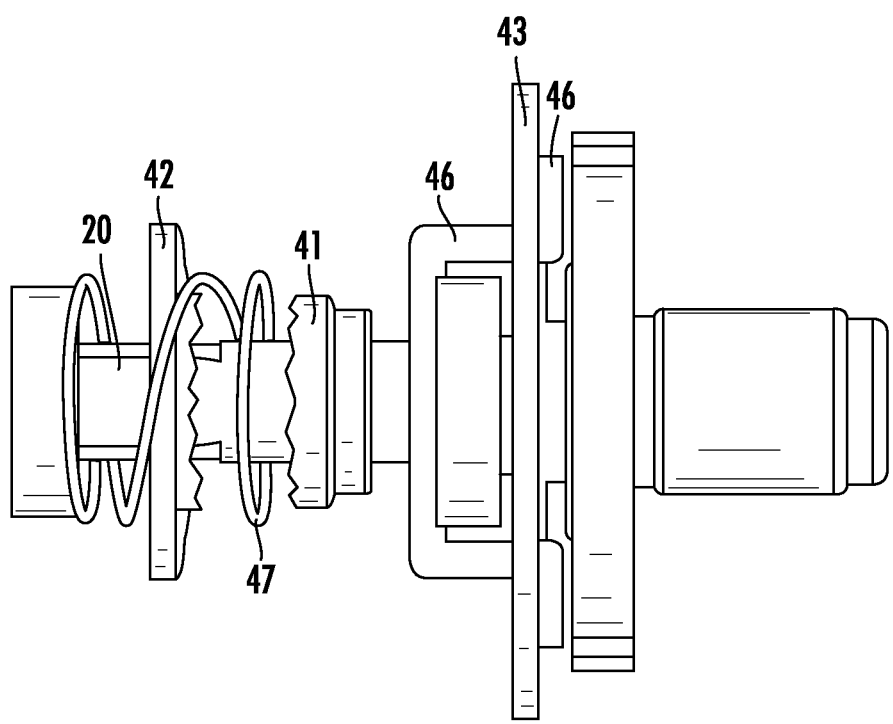
FIG. 9 is an illustration of components of the hammer mechanism including the hammer lockout mechanism.

FIGS. 7 to 9 of the attached drawings illustrates a hammer mechanism 40 (FIG. 2) of the multi-function tool 10. The hammer mechanism 40 includes a first ratchet 41 coupled for co-rotation with the spindle 20, a second ratchet 42 rotationally and axially fixed to a transmission housing 19 of the hammer drill and a hammer lockout mechanism 43, 44, 45, 46 for selectively inhibiting the ratchets 41, 42 from engaging when the multi-function tool 10 is in a "screwdriver mode" or a "drill-only mode", which would otherwise impart axial reciprocation to the spindle 20. The hammer lockout mechanism includes a ring 43 coupled for co-rotation with and positioned inside the clutch/mode collar 18. The ring 43 has a plurality of radially-outward extending recesses 44. The hammer lockout mechanism also includes a plurality of asymmetrically arranged axial arms 45 each with a radially-outward extending tab 46. The arms extend from a hub coupled for axial, but not rotational, movement with the spindle 20.

As shown in FIG. 7 when the mode collar 18 and lockout ring 43 are rotated to corresponding positions for either "screwdriver mode" or "drill-only mode," the tabs 46 of arms 45 are misaligned with the recesses 44. In response to the spindle 20 being depressed against a workpiece, the arm tabs 46 abut against the lockout ring 43, and interfere with rearward sliding movement of the spindle 20, inhibiting contact between the ratchets 41, 42 thereby enabling the hammer lockout mechanism 40, and inhibiting reciprocation of the spindle 20. However, as shown in FIG. 8, when the mode collar 18 and lockout ring 43 are rotated to a corresponding position for a "hammer drill mode," the arm tabs 46 are aligned with the recesses 44 in the lockout ring 43, permitting the arm tabs 46 to pass through the recesses 44 during rearward sliding movement of the spindle 20. This allows the ratchets 41, 42 to contact each other to impart impacting reciprocation to the spindle 20 thereby disabling the hammer lockout mechanism 40.

Advantageously the use of a single mode setting collar that can be rotated to one of a plurality of positions to engage two or more torque clutch limited screwing modes, or non-torque limited dill or hammer drill modes provides a quick and easy mode setting means for a user. It also ensures that without thought the user can only select a single mode of operation, for example the user cannot enable a torque clutch limited mode while also in drill or hammer drill mode which might not be the case where the hammer and drill modes selector is separate from the torque clutch setting collar.

The invention claimed is:

1. A multi-function handheld electric tool comprising:
    a motor housing and a motor located inside the housing, the motor having a motor output to which a speed reduction transmission is mounted to be rotatable therewith,
    a settable clutch coupled with the speed reduction transmission to transmit torque from the speed reduction transmission to an output spindle coupled with a chuck,
    a transmission housing coupled to the motor housing and having a first housing portion coupled to the motor housing, and a second housing portion extending from the first portion towards the chuck, at least a part of the speed reduction transmission and the clutch being located within the first portion of the transmission housing,
    a setting collar which is rotatably fit over the second housing portion of the transmission housing and rotatable between a plurality of predetermined angular positions of which at least one corresponds to a non-torque limited first operation mode of the tool and the remaining positions correspond to different torque output levels of a torque limited second operation mode of the tool, the settable clutch comprising a clutch face having a plurality of clutch ramps extend a fixed axial distance from a linear portion of the clutch face, a clutch washer and a clutch sleeve axially and rotatably located about the second portion of the transmission housing and between the setting collar and the second portion of the transmission housing, the clutch sleeve being located a variable axial distance from the clutch washer, a clutch spring biased between the clutch sleeve and the clutch washer, and a follower located between the clutch face and the clutch washer, wherein the clutch sleeve is rotationally fixed with the setting collar and rotatable therewith to move axially on the second portion of the transmission housing such that the variable axial distance is dependent on a respective one of the plurality of predetermined angular positions of setting collar, and wherein in the at least one angular position of the setting collar that corresponds to the non-torque limited first operation mode of the tool the fixed axial distance is greater than the variable axial distance, and in the remaining predetermined angular positions of the setting collar the variable axial distance is greater than the fixed axial distance.

2. The multi-function handheld electric tool of claim 1 wherein at least a second one of the predetermined angular positions of the setting collar corresponds to a non-torque limited third operation mode of the tool, wherein in the second one of the predetermined angular positions the fixed axial distance is greater than the variable axial distance.

3. The multi-function handheld electric tool of claim 2 wherein in at least one of the first or second ones of the predetermined angular positions of the setting collar corresponding to the non-torque limited first or third operation modes of the tool a portion of the clutch sleeve engages with a portion of the clutch washer.

4. The multi-function handheld electric tool of claim 1 wherein the clutch sleeve and clutch washer are positioned outside of the transmission housing, the clutch sleeve being threadably engaged with the second portion of the transmission housing for translating rotational movement of the clutch sleeve into axial movement along the second portion of the transmission housing.

5. The multi-function handheld electric tool of claim 4 wherein the clutch washer is positioned adjacent a transition between the first and second portions of the transmission housing, and wherein the follower includes a pin extending through a bore in the transmission housing.

6. The multi-function handheld electric tool of claim 1 further comprising a pair of opposed ratchet discs located within the second portion of the transmission housing and arranged to selectively impart axial vibrations or impacts to the output spindle, and a lockout mechanism a portion of which is rotatable with the setting collar, the lockout mechanism having an engaged position corresponding to the angular positions of the setting collar that correspond to different torque output levels of the torque limited second operation mode of the tool, and a disengaged position corresponding to one of the first or second angular positions of the setting collar that correspond to the non-torque limited first or third operation modes of the tool, wherein in the engaged position axial vibrations or impacts to the output spindle are inhibited and in the disengaged position axial vibrations or impacts to the output spindle are enabled.

7. The multi-function handheld electric tool of claim 6 wherein the lockout mechanism comprises a ring coupled for co-rotation with the setting collar and having a radially-outward extending recess, and an axial arm coupled for axial, but not rotational, movement with the output spindle and having a radially-outward extending tab, wherein in the disengaged position the radially-outward extending recess and radially-outward extending tab are rotationally co-aligned such that the tab may pass through the recess to allow axial movement of the arm and output spindle.

* * * * *